United States Patent
Fowler et al.

(10) Patent No.: US 9,724,612 B2
(45) Date of Patent: Aug. 8, 2017

(54) INTEGRATED GAMER PROFILE ACROSS MULTIPLE DEVICES AND NETWORKS

(75) Inventors: J. Clinton Paul Fowler, Seattle, WA (US); Haifeng Zhou, Sammamish, WA (US); Harris D. Thurmond, Seattle, WA (US); Walter Reed Rector, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1250 days.

(21) Appl. No.: 11/282,147

(22) Filed: Nov. 18, 2005

(65) Prior Publication Data
US 2007/0117629 A1    May 24, 2007

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/795 | (2014.01) |
| A63F 13/335 | (2014.01) |
| A63F 13/71 | (2014.01) |
| A63F 13/30 | (2014.01) |
| G06Q 30/02 | (2012.01) |

(52) U.S. Cl.
CPC ............ *A63F 13/795* (2014.09); *A63F 13/12* (2013.01); *A63F 13/335* (2014.09); *A63F 13/71* (2014.09); *G06Q 30/02* (2013.01); *A63F 2300/407* (2013.01); *A63F 2300/5546* (2013.01); *A63F 2300/57* (2013.01)

(58) Field of Classification Search
CPC ........ A63F 13/00; A63F 13/77; A63F 13/795; A63F 13/798; A63F 2300/5556; A63F 2300/5588
USPC .......................................................... 463/42
See application file for complete search history.

(56) References Cited

U.S. PATENT DOCUMENTS

| | | | |
|---|---|---|---|
| 6,821,205 B2 * | 11/2004 | Takahashi et al. | ............. 463/42 |
| 6,902,484 B2 | 6/2005 | Idaka | ............... 463/43 |
| 7,206,788 B2 * | 4/2007 | Horvitz et al. | |

(Continued)

FOREIGN PATENT DOCUMENTS

| | | |
|---|---|---|
| EP | 1078667 B1 | 2/2001 |
| EP | 1275423 A2 | 1/2003 |

(Continued)

OTHER PUBLICATIONS

Eric Qualls, "About.com: Xbox 360 Xbox Live Details", About.com, Sep. 17, 2005 <http://web.archive.org/web/20050923192459/http://xbox.about.com/od/xbox2/a/xblx360info.htm>.*

(Continued)

*Primary Examiner* — Milap Shah
*Assistant Examiner* — Jason Pinheiro
(74) *Attorney, Agent, or Firm* — Baker & Hostetler LLP (57) ABSTRACT

An integrated user profile is provided to PC/console gamers who also participate in other online gaming community activities such as web sites that provide online gamer forums. Provided to the users is the ability to view, access, and/or contribute to their console gamer profile using the other online gaming community activities such as participation in web sites. Also, an identity and profile first created on the web site is that which will be used and stored in game play using the PC/console and online live gaming service.

21 Claims, 5 Drawing Sheets

(56) References Cited

U.S. PATENT DOCUMENTS

2003/0204566 A1     10/2003   Dhupelia
2006/0258463 A1*   11/2006   Cugno et al. ................... 463/42

FOREIGN PATENT DOCUMENTS

| EP | 1437875 B1 | 7/2004 |
|---|---|---|
| EP | 1553511 | 7/2005 |
| JP | 2002-163222 | 6/2002 |
| JP | 2002-334274 A | 11/2002 |
| JP | 2004-54352 A | 2/2004 |
| JP | 2004-62865 A | 2/2004 |
| JP | 2005-31861 A | 2/2005 |
| KR | 1020010018629 | 3/2001 |
| KR | 1020030048275 | 6/2003 |
| KR | 10-2004-0035105 | 4/2004 |
| KR | 1020050090903 | 9/2005 |

OTHER PUBLICATIONS

Korean Application No. 10-2008-7011417; Notice of Final Rejection; dated Mar. 13, 2014; 9 pages.

\* cited by examiner

INTEGRATED GAMER PROFILE ACROSS MULTIPLE DEVICES AND NETWORKS

BACKGROUND OF THE INVENTION

In online gaming, a multimedia console gamer has a gamer profile that is unique to the console they play on. When they play games on the console, the user profile information for those games is stored in locally on a memory unit or hard drive. When that same user surfs the web and specifically, participates in any sort of game-related forum on the web, they can not view, access, or contribute to that locally stored profile. There is no ability for users to view, access, and/or contribute to their console gamer profile using the web sites or other servers than the online gaming service.

Also, gamers who first participate in game-related forums on the internet and the web before participating in online gaming, have no way to easily connect their game-related identity and profile on the internet and the web to the online gaming identity and profile created once they choose to participate in online gaming.

Additionally, there is no ability for gamers to integrate into one identity the profile information particular to that created during the online gaming participation (such as game achievements, for example) to other user profile information particular to that created when participating in the game-related forums within web sites (such as reputation ratings, for example).

In view of the foregoing, there is a need for a system that overcomes the drawbacks of the prior art.

SUMMARY OF THE INVENTION

User profile information is received through a user's use of an online gaming service that allows users to interact with each other over a network through a computer game, or received through the user's use of a service for providing game-related information to users other than that service providing the online gaming service. This user profile information received is then stored in a central database. At least some of the user profile information for that user stored in the central database is then provided to the user when said user connects to a service other than that through which the user profile information was originally obtained.

Also, the user profile information may be received through a user's use of a service that provides an online gaming service that allows users to interact with each other over a network through a computer game and also provides a web site that provides game-related information to users other than that providing the online gaming service. This user profile information received is then stored in a central database. At least some of the user profile information is provided, and in a consistent manner, to the user and other users of the online gaming service and web site to identify the user as the same user in both the online gaming service and web site.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Figure 1:
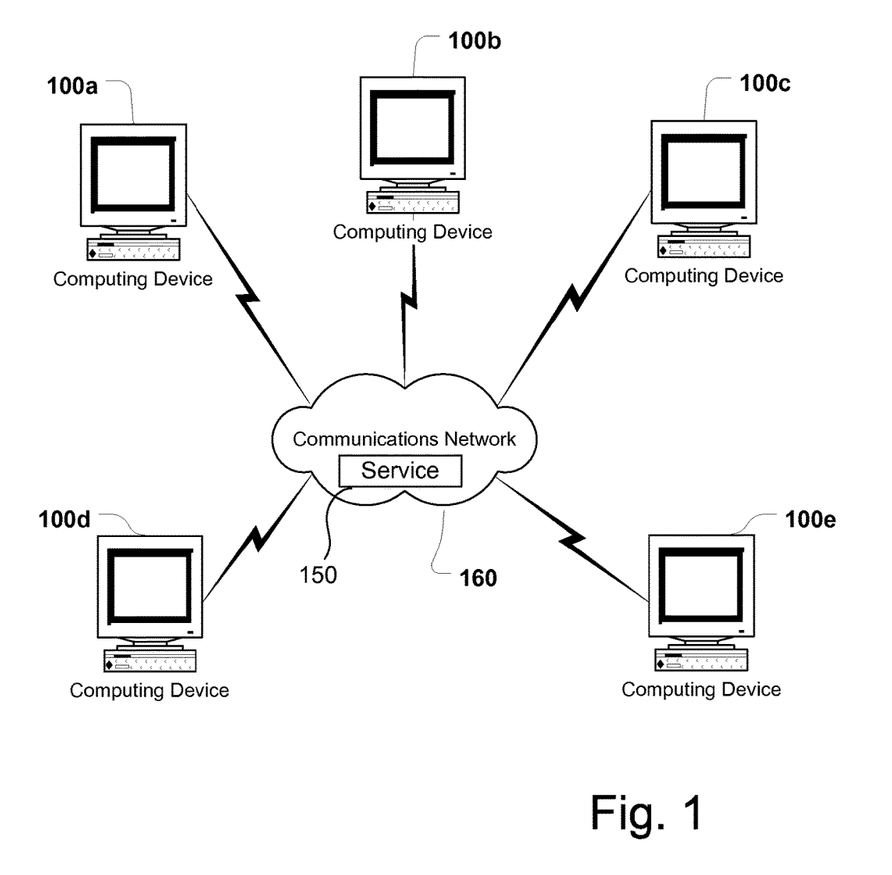
FIG. 1 is a block diagram of an exemplary computer network environment in which aspects of the present invention may be implemented.

FIG. 1 is diagram of an exemplary computer network that serves to illustrate aspects of the invention. Here computers 100a-100e may host various ones of the computing objects such as games and other applications. Although the physical environment shows the connected devices as computers, such illustration is merely exemplary and may comprise various digital devices such as PDAs, game consoles, etc. Moreover, communications network 160 may itself comprise a number of computers, servers and network devices such as routers and the like.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks. Aspects of the present invention could be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL)

or an Internet Protocol (IP) address is used to identify the server or client computers to each other. Communication among computing devices is provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or a combination of any of these that facilitates communication among a number of computing devices 100a-100e. Moreover, communication network 160 may comprise wireless, wireline, or combination wireless and wireline connections. Additionally, the computer network may comprises a distributed computing environment. In such an environment a computing task may be spread over a number of computing devices that are addressable elements in a computer network.

According to an aspect of the invention, communication network 160 may host a service 150 that is accessible from the plurality of computers 100a-100e. The service 150 gathers information and tracks users of computers 100a-100e to provide computing services for all of the users of the service.

Figure 2:
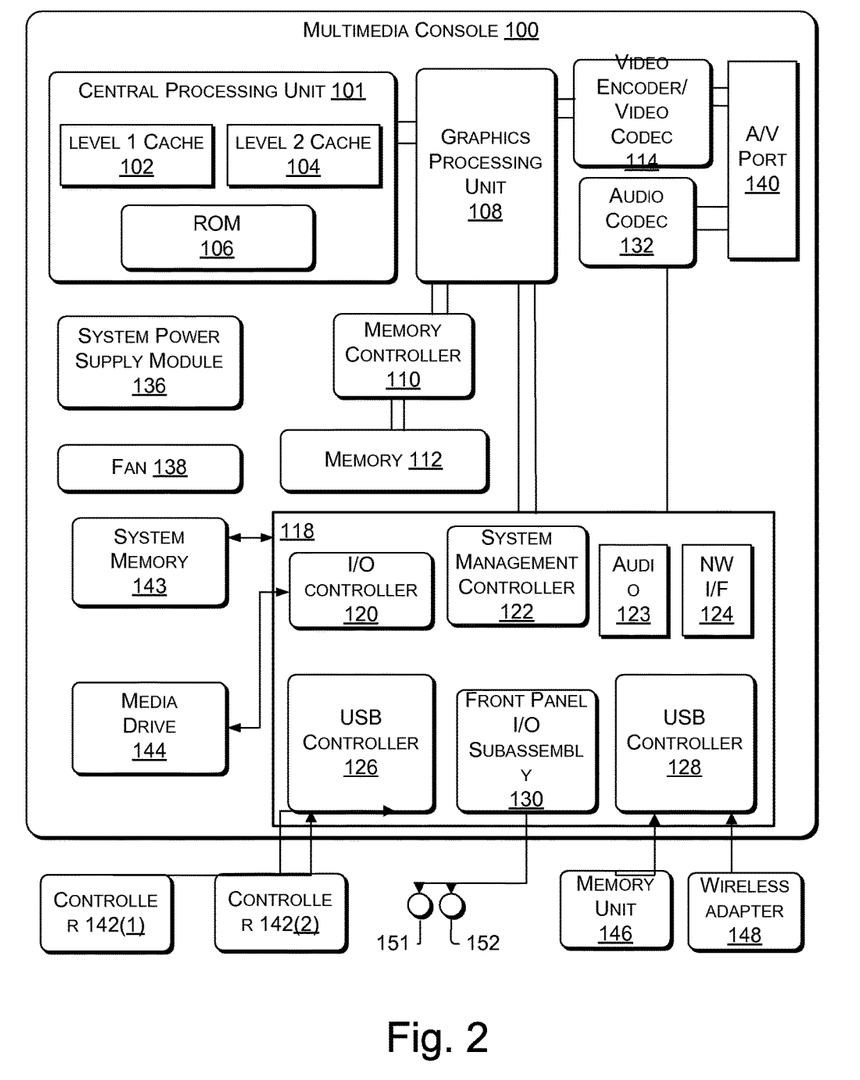
FIG. 2 is a block diagram illustrating an exemplary console that can be incorporated into a network computing environment such as the network computing environment of FIG. 1.

FIG. 2 illustrates the functional components of a multimedia/gaming console 100 that may be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 151 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in the larger network community as illustrated in FIG. 1.

According to an aspect of the invention, when a game is executed on console 100, it provides information to an online gaming service 150 operating on communications network 160. The online gaming service 150 tracks the information for all of the users connected to the online gaming service 150 to provide a rich user experience. The online gaming service 150 tracks user information across games, consoles, computing devices, etc. By tracking the information for all users of the online gaming service 150, the online gaming service can aggregate statistics for all users and measure game playing ability, provide a richer user experience by providing information about friends (e.g., what game they are playing and what skill level they have attained), track user achievements and generally measure statistics for a game aggregated over a large user community.

In order to provide a consistent data set across games, the invention contemplates a schema driven process where each game generates a schema that defines the game data for a particular game. Through a game configuration process, games use a service-defined schema to describe the data the game generates about each game player. By using the configuration process, the online gaming service 150 will be able to understand the data as it flows from the game, and it will be able to integrate it in meaningful ways with the other data that the online gaming service 150 understands to create a rich profile of each user of the online gaming service. The profile will follow the user wherever he goes on the online gaming service 150, i.e. it is game and location independent. Some of the profile, in fact, will be viewable by every user of the online gaming service 150.

Figure 3:
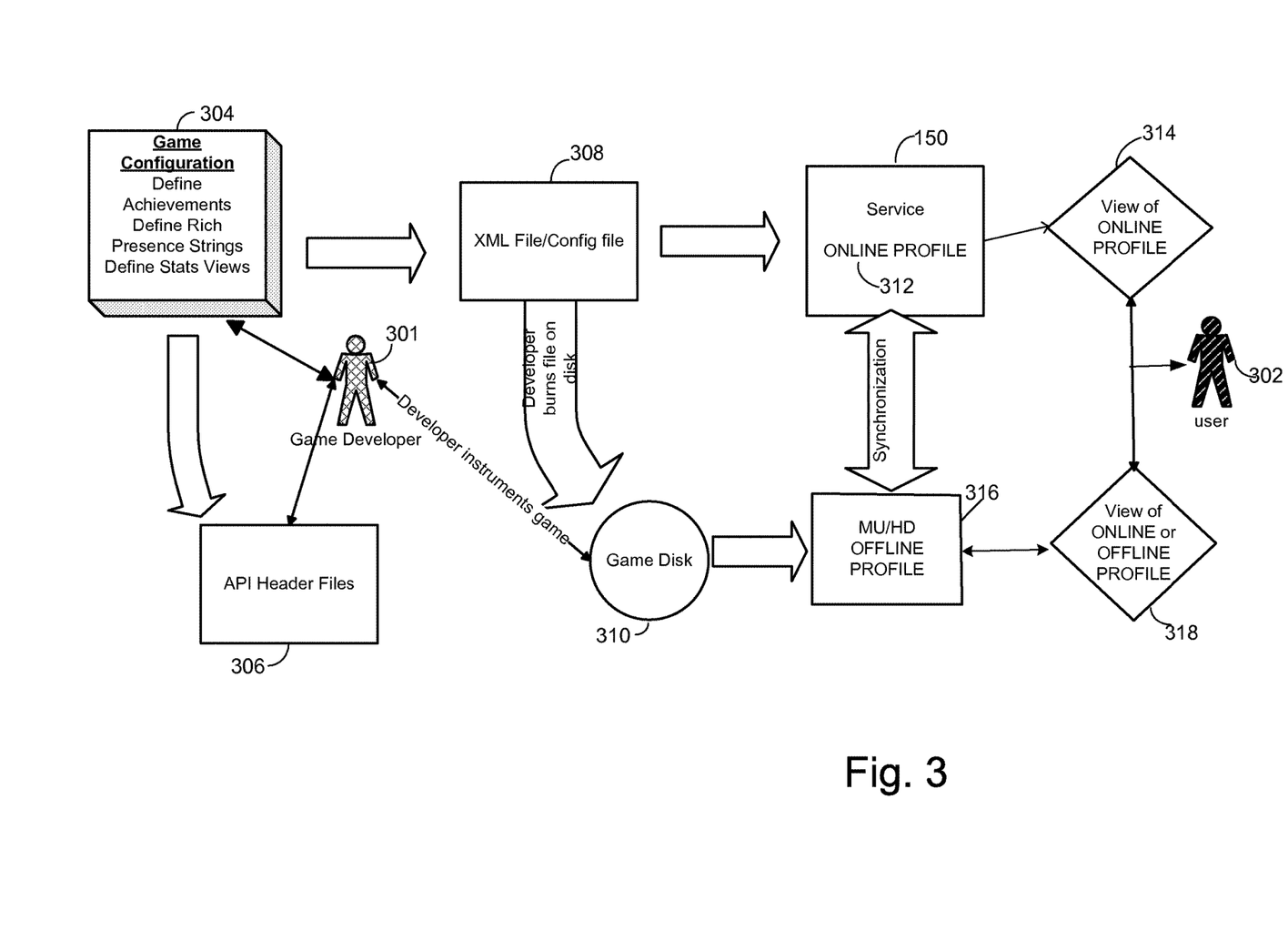
FIG. 3 illustrates the overall system of allowing a game application to communicate with an online gaming service.

FIG. 3 illustrates the overall process that allows a game developer to configure a game for use with the online gaming service 150. A game developer 301 wants to create a game for use with the online gaming service 150 by user 302. To that end, the developer provides a set of game configuration data 304 that will be shared with the online gaming service 150. The output from the use of the tool is a set of API header files 306 that are included with the game to communicate with the online gaming service 150 and a set of xml files 308 that define the schema of the data to be shared with the online gaming service 150. Game developer 301 then burns a game disk 310 or creates a game program that contains the game code instrumented with the APIs 306 an the XML schema files 308 (or an equivalent representation). The XML files 308 are also communicated to the online gaming service 150 so that the online gaming service 150 can use the data output from the game to update the online user profile 312 for user 302 when user 302 uses the game 310 online. When user 302 uses game 310 without a network connection, information is collected and stored on the users offline profile in a hard drive or memory unit 316. Thereafter, when user 302 connects to the online gaming service 150, the online and offline profile is synchronized. User 302 can then view profile information locally 318, i.e. on the console 100 or PC or log on to the online gaming service 150 and view the user profile 314. Also, as explained in further detail below, the user is able to log on to a separate gaming web site to view the integrated online gamer profile or create it on the web site for the first time.

Figure 4:
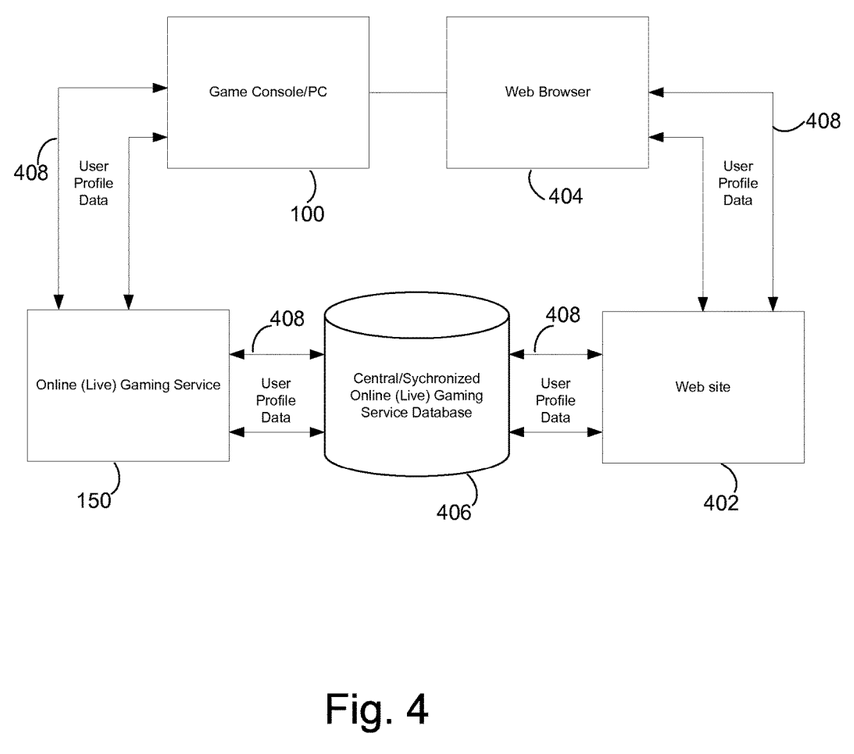
FIG. 4 illustrates the overall system of providing an integrated gamer profile across an online gaming service, gaming World Wide Web (web) site, and multiple devices.

Referring next to FIG. 4, shown is a diagram that illustrates the overall system of providing an integrated gamer profile 312 across an online gaming service 150, gaming web site 402, and multiple devices, for example, such as a game console or PC 100, or any device running a web browser 404. The user 302 can use credentials received from creating the online profile 312 with the online gaming service 150 to log onto a gaming web site or other web sites 402 using any web browser 404. The web browser 404 may be running on the game console/PC 100, or any device connected to the web. However, using the web is provided as an example, and other communication and computer networks besides the web may be used to communicate and modify user profile data as described herein. The gaming web site 402 will have the online profile 312 information for that user created from the online gaming service to create an online integrated profile 312 to present at the web site 402. This is because both web site 402 and online gaming service 150 are communicatively connected (for example, over a network 160 as shown in FIG. 1) to a central/synchronized online gaming service database 406 which stores and synchronizes the user profile data 408 received from both the online gaming service 150 and the web site 402.

Figure 5:
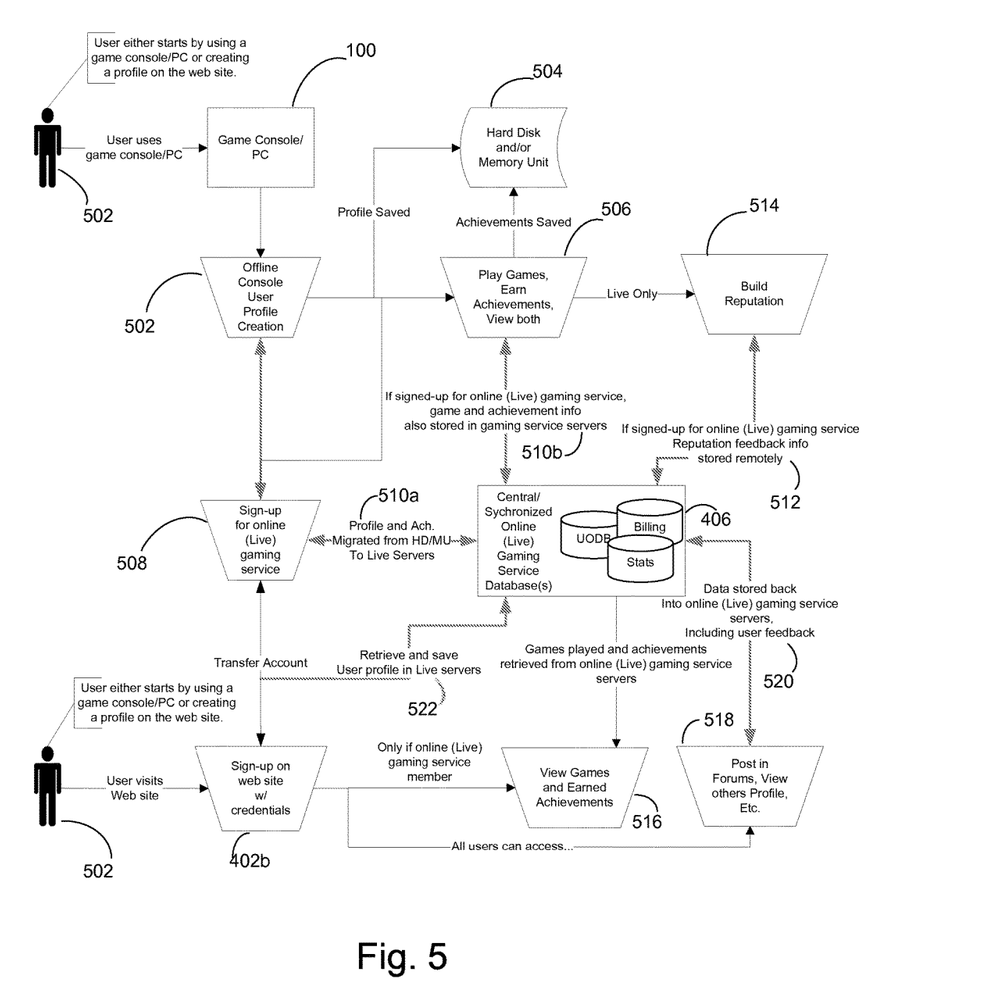
FIG. 5 is a system and flow diagram that illustrates the creation and maintenance of an integrated gamer profile across an online gaming service, gaming web site, and multiple devices.

Referring next to FIG. 5, shown is a system and flow diagram that illustrates the creation and maintenance of an integrated gamer profile 312 across an online gaming service 150, gaming web site 402, and multiple devices. For example, a user creates the integrated gamer profile 312 one of two different ways, either starting from the game console/PC 100 or from the web site 402. In the case of starting from the game console/PC 100, the user first creates an offline gamer profile 502 that is stored locally on a hard drive or memory unit 504 as described above with reference to FIG. 3, for example. The user can play games, earn achievements, get high scores, and view 506 all this information locally from the game console/PC 100. The user 302 then signs-up 508 for the online gaming service 150 and that offline gamer profile is now stored 510a 510b and available in the central/synchronized online gaming service database(s) 406, making the games played, achievements, and scores available to any other user that is a member of the online gaming service 150. Additionally, the other members of the online gaming service can submit feedback 512 about that user 302, helping to build that individuals reputation 514 within the gaming community.

Due to the integrated gamer profile 312 information being stored in the online gaming service database 406, when the user 302 now signs into the web site 402, he/she can sign-in using his/her credentials 402b, such as a user name and password, (e.g., using Microsoft® Passport) from creating 508 the online gaming service 150 account and view, access, and contribute 516 to that gamer profile 312 while participating in various activities on the web site 402. These activities may include, among others, posting comments in community forums and viewing other gaming web site members profiles 518. This includes displaying that users gamer card, which is a subset of information from the users gamer profile that includes a gamertag (i.e., gamer alias or name), picture, gamer score, gamer zone, reputation, and the most recent games the user has played. Based on the users 302 activities on the web site 402, other users can submit feedback 518 on the user 302 and impact that user's reputation.

Anything that happens around the user 302, whether it is on the console/PC 100 or on the gaming web site 402, is stored back 510 512 520 522 to the central/synchronized online gaming service database(s) 406, enabling one integrated gamer profile 312 that users 302 from either the console/PC 100 and/or web site 402 community can view and interact with while also allowing the user 302 to maintain one identity.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method comprising:
    communicatively connecting an online gaming server and a web site to a central online gaming service database that stores and synchronizes user profile data from both the online gaming server and the web site;
    enabling a user to create an online profile and to log into said web site using credentials received from the online gaming server during creation of the online profile;
    receiving, by the central online gaming service database, online user profile information from a gaming device while the gaming device is connected to a network including the central online gaming service database, the online user profile information being associated with a user of the gaming device and updating the online profile created by the user of the gaming device with the online user profile information;
    receiving, by the central online gaming service database, offline user profile information, the offline user profile information comprising achievement information generated by the gaming device while the gaming device was not connected to the network, the offline user profile information being associated with the user of the gaming device and updating the online profile created by the user of the gaming device with the offline user profile information;
    receiving web user profile information from the web site indicative of activities of the user on the web site and updating the online profile created by the user with the web user profile information; and
    enabling the user to view and interact with the user's online profile using a single identity for the web site and the online gaming server.

2. The method of claim 1 further comprising:
    receiving a logon from the user, said logon accomplished using the credentials received by the user from the online gaming server; and
    providing at least some of the online user profile information to the user when the user logs in through a web site with the logon.

3. The method of claim 2 further comprising:
    providing in a consistent manner at least some information of the user's online profile to the online gaming server and the web site to identify the user as the same user in both the online gaming server and the web site.

4. The method of claim 1 further comprising:
    providing to the user viewing access to the offline user profile information when the user is offline and viewing access to the online user profile information when the user is online.

5. The method of claim 1 further comprising:
    receiving by the online gaming server, at least one file that defines a schema of data associated with the gaming device, wherein the at least one file comprises at least one API header file and a XML schema file, the at least one API header file and the XML schema file configured for instrumenting a game played by the user on the gaming device.

6. The method of claim 5, comprising:
    configuring the online gaming server, based on the XML schema file, to update the user's online profile.

7. The method of claim 1, wherein the user uses a personal computer to log in through the web site associated with the web user profile information for viewing the user's online profile, and wherein receiving the offline user profile information comprises coupling the gaming device to a television set and to the network.

8. The method of claim 7, wherein the personal computer is configured to accommodate accessing the online gaming server through the network.

9. The method of claim 1, further comprising viewing, accessing, and contributing to the web user profile information while the user is logged on the web site that is associated with activities of the user.

10. A computer readable storage medium having a tangible physical structure, the medium having stored thereon instructions for performing the steps of:
    enabling a user to create an online profile and to log into a web site using credentials received from an online gaming server during creation of the online profile, the web site and online game server being communicatively connected to a central online gaming service database that stores and synchronizes user profile data from both the online gaming server and the web site;
    receiving online user profile information from a gaming device while the gaming device is connected to a network including a central online gaming service database, the online user profile information being associated with a user of the gaming device and updating the online profile created by the user of the gaming device with the online user profile information;
    receiving offline user profile information, the offline user profile information comprising achievement information generated by the gaming device while the gaming device was not connected to the network, the offline user profile information being associated with the user of the gaming device and updating the online profile created by the user of the gaming device with the offline user profile information;
    receiving web user profile information from the web site indicative of activities of the user on the web site and updating the online profile created by the user with the web user profile information; and
    enabling the user to view and interact with the user's online profile using a single identity for the web site and the online gaming server.

11. The computer readable storage medium of claim 10 further comprising:
    receiving a logon from the user, said logon accomplished using the credentials received by the user from the online gaming server; and
    providing at least some of the online user profile information to the user when the user logs in through a web site with the logon.

12. The computer readable storage medium of claim 11, having stored thereon instructions further for:
    providing in a consistent manner at least some information of the user's online profile to the online gaming server and the web site to identify the user as the same user in both the online gaming server and the web site.

13. The computer readable storage medium of claim 10, having stored thereon instructions further for:
    providing to the user viewing access to the offline user profile information when the user is offline and viewing access to the online user profile information when the user is online.

14. The computer readable storage medium of claim 10, wherein receiving the offline user profile information comprises coupling the gaming device to a television set and to the network, and wherein the user uses a personal computer to log in on the web site associated with the web user profile information for viewing the user's online profile.

15. The computer readable storage medium of claim 14, wherein the personal computer is configured to accommodate accessing the online gaming server through the network.

16. A system comprising:
a central online gaming service database communicatively connected to an online gaming server and a web site via a network, the central online gaming service database storing and synchronizing user profile data from both the online gaming server and the web site;
means for enabling a user to create an online profile and to log into said web site using credentials received from the online gaming server during creation of the online profile;
the central online gaming service database receiving online user profile information from a gaming device while the gaming device is connected to the network, the online user profile information being associated with a user of the gaming device, and the central online gaming service database updating the online profile created by the user of the gaming device with the online user profile information;
the central online gaming service database receiving offline user profile information, the offline user profile information comprising achievement information generated by the gaming device while the gaming device was not connected to the network, the offline user profile information being associated with the user of the gaming device, and the central online gaming service database updating the online profile created by the user of the gaming device with the offline user profile information;
the central online gaming service database receiving web user profile information from the web site indicative of activities of the user on the web site and updating the online profile created by the user with the web user profile information; and
means for enabling the user to view and interact with the user's online profile using a single identity for the web site and the online gaming server.

17. The system of claim 16 further comprising:
means for receiving a logon from the user, said logon accomplished using the credentials received by the user from the online gaming server; and
means for providing at least some of the online user profile information to the user when the user logs in through a web site with the logon.

18. The system of claim 17 further comprising:
means for providing in a consistent manner at least some information of the user's online profile to the online gaming server and the web site to identify the user as the same user in both the online gaming server and the web site.

19. The system of claim 16 further comprising:
means for providing to the user viewing access to the offline user profile information when the user is offline and viewing access to the online user profile information when the user is online.

20. The system of claim 16, further comprising means for coupling the gaming device to a television set and to the network, and a personal computer adapted to enable the user to log in on a web site associated with the web user profile information for viewing the user's online profile.

21. The system of claim 20, wherein the personal computer is configured to accommodate accessing the online gaming server through the network.

* * * * *